Dec. 15, 1959   L. A. M. PHELAN ET AL   2,917,200
PRESSURE COOKER
Filed Aug. 23, 1956
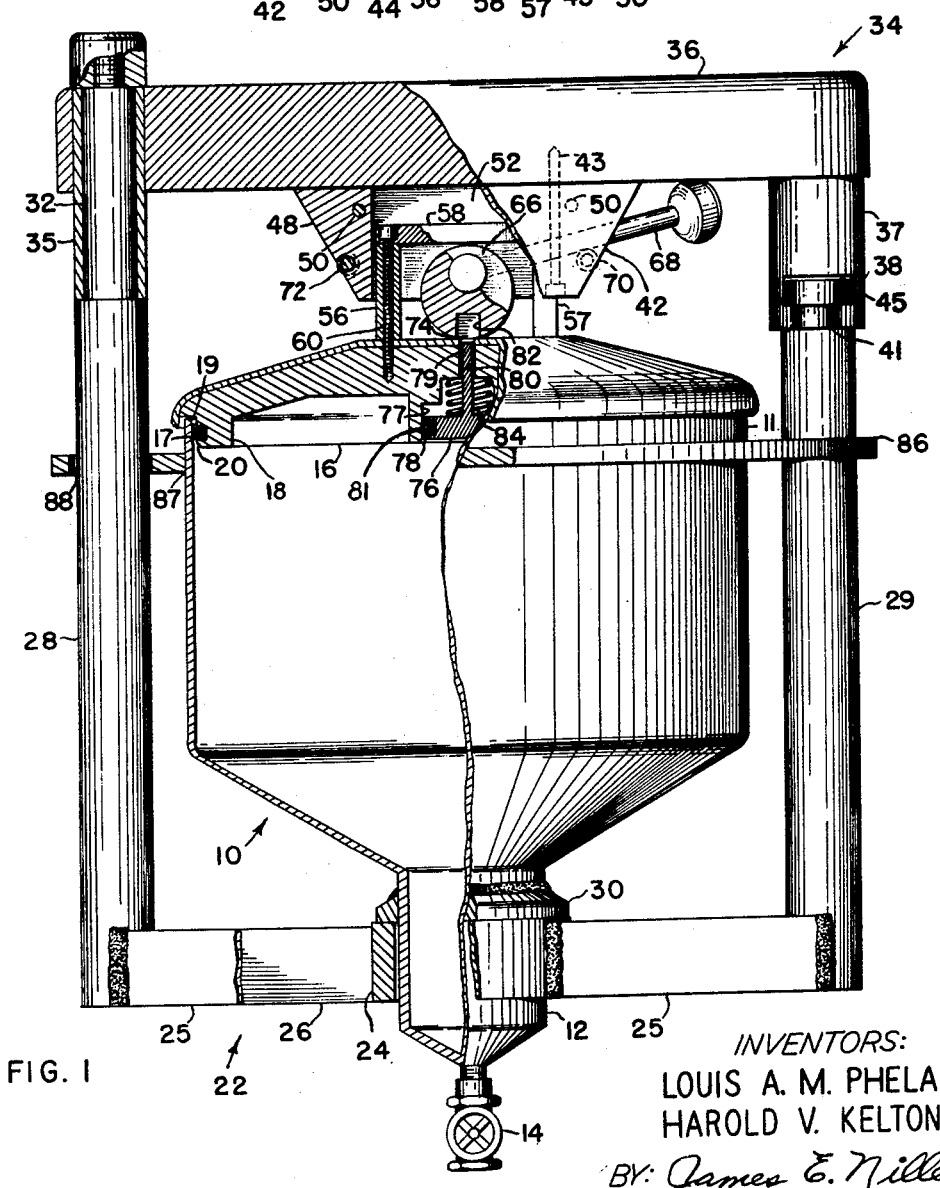
INVENTORS:
LOUIS A. M. PHELAN
HAROLD V. KELTON
BY: James E. Nilles
ATTORNEY

United States Patent Office 2,917,200
Patented Dec. 15, 1959

2,917,200

PRESSURE COOKER

Louis A. M. Phelan, Roscoe, and Harold V. Kelton, South Beloit, Ill.; said Kelton assignor to said Phelan Application August 23, 1956, Serial No. 605,872

9 Claims. (Cl. 220—55.3)

This invention relates to pressure cookers of the relatively large stationary type. The invention finds particular utility in pressure cookers of the type in which parts of one or more chickens or other large pieces of food are loaded into the cooking vessel from the top and a sealing cover is then placed over the vessel and locked in position.

The food is immersed in a very hot non-aqueous, non-toxic cooking fluid and pressure is built up within the vessel so as to cook the food in a matter of minutes.

It will be appreciated that in relatively large vessels of this type where pressure of 65 p.s.i. are commonplace, a considerable force is exerted within the vessel and the cover must effectively seal against these pressures, be locked in position during operation and be completely foolproof against accidents. Temperatures ranging between 350 to 450 degrees Fahrenheit are also used for the cooking liquid and consequently the cover is very hot as well being large, heavy and generally awkward to handle. In establishments where cookers of this type are utilized, speed and efficiency of operation are essential. The loading and unloading of these pressure vessels occurs rapidly and many times a day and these operations must be fast and effortless for the operator and as safe and foolproof as possible.

It is therefore an object of the invention to provide a mechanism for quickly and easily swinging the cover of a pressure cooker between operative and inoperative positions, said mechanism including positive and quick acting means for positioning the cover in sealing engagement with the vessel and locking it therein. The arrangement is such that the entire cover assembly together with the locking means may be swung completely free of the vessel and conveniently supported while the vessel is being loaded or unloaded.

It is another object of the invention to provide an improved manually operated cam for urging a cover into sealing engagement with a pressure cooker vessel, said cover having a pressure operated piston for positively locking the cam itself against opening movement while pressure above a pre-determined amount is still present in the vessel.

It is still another and important object of the invention to provide an extremely simple and effective frame for supporting the cooking vessel and for holding it in assembled relationship with the cover in a rigid and very positive manner even though pressures within the pot exert considerable force on the cover.

It is still another object of the present invention to provide an efficient, economical and practical means for holding the concentricity of a relatively thin-walled pressure cooker vessel so as to insure proper sealing of its cover. A more specific object of the invention contemplates that this means take the form of a shrink ring located on the outside of the vessel.

Still another object of the invention is to provide a pressure cooker vessel having a shrink ring of the above type, said ring having guiding means for accurately locating the supporting framework of the cooker and thereby providing a convenient and practical means of assembly.

Other objects and advantages will become more apparent from the following detailed description, taken in conjunction with the attached sheet of drawings in which, by way of preferred example only, is illustrated the invention.

In the drawing:

Figure 1 is a front elevational view, with certain parts broken away and in section, of a pressure cooker and supporting frame assembly built in accordance with the invention.

Figure 2 is a plan view of the upper part of the support frame, more particularly the yoke assembly, shown in Figure 1.

Referring in greater detail to the drawing, the cooking vessel 10 is of cylindrical shape and has a top open end 11 through which the vessel is loaded and unloaded. The diameter of the vessel is sufficient to accommodate large pieces of meat or an entire chicken, some vessels being in the neighborhood of 80 square inches in cross sectional area. The lower end 12 of the vessel is of reduced diameter and has a drain cock 14 at its lower extremity. The vessel 10 is of relatively thin wall construction, being formed from sheet steel, for example stainless steel, by a conventional deep draw process. For a more complete description of the cooking process, or the mechanism for heating and pressurizing the vessel, reference may be had, if desired, to the co-pending U.S. application of Louis A. M. Phelan, Serial Number 521,021 filed July 11, 1955, entitled, "Process of Cooking Food," now Patent No. 2,827,379 which issued March 18, 1958.

A cover 16 formed from a casting is adapted to slide downwardly into the open end 11 of the vessel for sealing engagement therewith, and slide upwardly out of the vessel to an open position. More particularly, an O-ring seal 17 is set in the annular vertical flange 18 of the cover and this seal is compressed slightly by the inwardly converging taper 19 as it slides into the cylindrical vessel, and when the latter is pressurized, the O-ring acts in the conventional sealing manner. A beveled edge 20 is provided on the lower end of the cover to facilitate entry thereof into the vessel. The cover is rather large and of considerable weight and together with the frictional resistance of the sealing means is difficult to lift from the vessel and replace. These operations must be performed rapidly and many times during the day and to do so over a hot vessel, with its steaming characteristics, is a tiresome task. The inherent danger present in such a hot and pressurized cooker also makes this work trying.

In accordance with the present invention a convenient, positive and foolproof mechanism is provided for accomplishing the above tasks. A support frame is provided for holding the vessel 10 in an upright position and comprises a lower member 22 which is disposed in a substantially horizontal position beneath the vessel. This lower member 22 includes a central ring 24 having welded thereto at each side a pair of laterally extending plates 25, 26. Each of the plates 25, 26 are positionally vertically and are spaced a distance apart so as to receive the upstanding columns 28, 29 between their outer ends to which they are welded. The reduced portion 12 of the vessel is snugly received in the ring 24 and a bearing ring 30 is welded to portion 12 and rests on the top of ring 24.

The vertical columns 28, 29 extend upwardly along opposite sides of the vessel. The upper end of column 28 terminates in a reduced portion 32 over which is pivotally or swingably mounted the yoke assembly 34. This assembly 34 includes a sleeve portion 35 at one end which can be considered as being formed integrally with the yoke 36. At the other end of yoke 36 is a latch portion 37 having a T-shaped slot 38 as viewed in front elevation, at its lower end. Slot 38 does not extend entirely through latch portion 37 but terminates in a rear arcuate surface 40 (Figure 2). The upper end of column 29 terminates in a T-shaped latch portion consisting of a necked down diameter 41 and a larger diameter portion 45. When the yoke assembly is swung forwardly into the operating position as shown in the figures, the T-shaped slot 38 slips over the mating latch portion formed on the upper end of column 29 until the latter bears against the curved rear surface 40. In this position the yoke assembly cannot be moved in a vertical direction relative to the rest of the support frame.

The yoke assembly 34 also includes support means for easily and positively shifting the cover into and out of operative sealing engagement with the cooker or vessel 10 when the assembly is in the operative position above described. A front gusset 42 is rigidly secured by bolts 43, 44 threadably engaged in yoke 36. A rear gusset 46 and complementary guide blocks 48, 49 are rigidly secured to front gusset 42 by the two Allen head bolts 50. A hollow guideway 52 is thus formed between the gussets 42, 46 and the blocks 48, 49.

A pair of spaced studs 56, 57 have a lifter bar 58 joining their upper ends and the studs and bar are rigidly secured to the cover 16 by the bolts 60, 61 (only one shown) extending through the studs and threadably engaged in the cover. The studs and bar extend into the guideway 52 and form a sliding fit therewith.

A cam shaft 64 is rotatably journaled in gussets 42, 46 and has an eccentric or cam 66 fixed thereto which is located within guideway 52 and between the cover and lifter bar 58. An operating handle 68 is also rigidly fixed to the cam shaft for oscillating the cam. Stop pins 70, 72 extend through gusset 46 and are screwed into gusset 42. These pins extend from gusset 46 to define the limits of travel of the handle in the cover sealing (shown in the drawings) or open positions, respectively.

When in the position shown in the drawings, the lowest or active portion 74 of the eccentric is at or near dead-center to hold the cover firmly in the vessel. When the handle is oscillated to the fully open position where it abuts against pin 72, the surface 74 of the cam has been caused to ride against the lifter bar 58, forcibly raising the cover through the studs 56, 57 and bolts 60, 61. The cam arrangement shown provides a simple convenient and positive means for moving the hot, heavy cover and is strong enough to hold the cover in position against a force often in the neighborhood of 5,000 pounds. The yoke is capable of swinging the entire cover and assembly completely free of the vessel and provides a convenient support for the cover when loading or unloading the cooker.

A piston 76 is slidably mounted within a vertical bore 77 of the cover and is held captive therein by snap ring 78. An O-ring seal 81 is set in the periphery of piston 76 to seal it in the bore 77. A locking pin 79 is carried by the piston and extends upwardly through aperture 80 in the cover. When pressure above a predetermined amount is present in the vessel the piston urges pin 79 into the recess 82 of the cam to prevent releasing the cover under these circumstances. A spring 84 tends to urge the piston to the non-locking position. Thus an improved pressure operated piston type lock is provided in the cover which acts directly on the cam itself to prevent movement thereof and the entire yoke assembly is quickly removed free of the vessel for easy access thereto, there being no parts to adjust reset or align for subsequent operations.

As previously mentioned the cylindrical cooker 10 is formed from stainless steel which is of relatively thin material. These cylinders are usually out of round after manufacture. In other words they are "egg-shaped" in cross section by as much as one-eighth of an inch. It will be appreciated that it is essential to insure concentricity of the cylinder and maintain this concentricity in order to permit the cover to fit properly and to prevent rapid wear and distortion of the O-ring. Even if the cylinder is round initially, a severe jar or bump will distort it to cause malfunction. This has been a troublesome problem in the past from a manufacturing as well as a functional standpoint. Costly and unsatisfactory attempts have been made to true up the cylinder, by turning on a lathe for example.

In accordance with another important aspect of the invention, a plate-like shrink-ring 86 has been provided for these thin walled vessels adjacent their top edge where this concentricity is critical. As shown in Fig. 1, the major cross sectional axis of the ring extends generally horizontally, or away from the vessel, in order to provide the necessary rigidity. This horizontally disposed ring is first accurately machined, heated and slipped over the cylinder to cool and shrink in place, forming a tight fit at 87. The ring is then in tension and positively assures that the top edge of the vessel is concentric and is maintained so, despite rough handling. The ring serves to reinforce the entire circumference of the cooker.

The ring also serves other practical purposes. Passageways or apertures 88 are provided in the ring through which slip the columns 28, 29. In this manner assembly of the unit is facilitated by guiding and accurately locating the vessel relative to the frame. The smooth operation of the relatively moving parts, such as the yoke, cover and latch means and the effective sealing and maintaining of the cover seal is thus insured.

The entire frame is rigid and effectively holds both the upper and lower ends of the pressurized vessel, the columns 28, 29 being in tension. The yoke latch arrangement is simple, safe and positive and the columns and yoke latch are kept away from the hot gases which heat the pot.

What is claimed and desired to be secured by Letters Patent is:

1. In combination with a pressure cooker having an open top, a support frame, a yoke pivotally attached to said frame for horizontal swinging above said open top between operative and non-operative positions, latch means for securing said yoke and frame together in the operative position; a cover for said open top and mounted on said yoke for shifting between cooker closed and open positions, manually operated cam means mounted on said yoke for shifting said cover in either vertical direction, cooker pressure operated means mounted in said cover for engagement with said cam means whereby opening of said cover is precluded while pressure above a predetermined amount is present in said cooker.

2. In combination with a pressure cooker having an open top, a support frame, a yoke pivotally attached to said frame for horizontal swinging above said cooker between operative and non-operative positions, interengaging latch means for securing said yoke and frame together against relative vertical movement when in the operative position; a cover for said cooker mounted on said yoke for shifting between cooker closed and open positions, manually operated cam means mounted on said yoke for shifting said cover between said positions, cooker pressure operated means mounted in said cover for engagement with said cam means whereby opening of said cover is precluded while pressure above a predetermined amount is present in said cooker.

3. In a cylindrical pressure cooker vessel having an open top, a cover adapted to slide downwardly into said vessel for sealing thereof and slide upwardly away from said vessel for opening the latter, the improvement residing in; support means for slidingly supporting said cover, manually operated means mounted on said support means for sliding said cover into either of said sealing or opening directions, said support means being pivotally mounted for swinging in a generally horizontal plane, and cooker pressure operated means mounted in said cover for direct engagement with said manually operated means for locking the latter when a predetermined amount of pressure is in said vessel.

4. In a cylindrical pressure cooker vessel having an open top, a cover adapted to slide downwardly into said vessel for sealing thereof and slide upwardly away from said vessel for opening the latter, the improvement residing in; a horizontally swingable support means for vertically slidingly supporting said cover, a manually operated cam mounted on said support means for sliding said cover into either of said sealing or opening directions, cooker pressure operated piston means slidably mounted in said cover for direct engagement with said cam for locking the latter when a predetermined amount of pressure is in said vessel.

5. In a pressure cooker and frame assembly, a lower substantially horizontal member having means for supporting said cooker in an upright position, an upright column on each of two opposite sides of said cooker and rigidly secured at their lower ends to said lower member and extending upwardly and terminating in upper ends, a yoke pivotally mounted at one end to one of said upper ends for horizontal swinging above said cooker, latch means for securing the said other upper end and the other end of said yoke together to prevent relative vertical movement therebetween, a top cover for said cooker, manually shiftable eccentric means carried by said yoke and engageable with said cover for forcibly raising said cover from contact with said cooker and for holding said cover in a sealing position and whereby said columns are in tension when said cooker is pressurized.

6. A cylindrical pressure vessel and frame assembly comprising, a lower horizontal member having means for supporting said vessel in an upright position, a vertical column on each of two opposite sides of said vessel and rigidly secured at their lower ends to said lower member and extending upwardly and terminating in upper ends, a yoke swingably mounted at one end on one of said upper ends for horizontal swinging above said vessel, latch means for securing the said other upper end and the other end of said yoke together to prevent relative vertical movement therebetween, a top cover for sealing said vessel, a manually shiftable cam carried by said yoke and engageable with said cover for forcibly raising said cover from contact with said cooker and for holding said cover in a sealing position whereby said columns are in tension when said vessel is pressurized.

7. In a pressure cooker and frame assembly, a lower substantially horizontal member having means for supporting said cooker in an upright position, an upright column on each of two opposite sides of said cooker and rigidly secured at their lower ends to said lower member and extending upwardly and terminating in upper ends, a yoke pivotally mounted at one end to one of said upper ends, latch means for securing the said other upper end and the other end of said yoke together to prevent relative vertical movement therebetween, a top cover for said cooker, manually operated means carried by said yoke for positioning and holding said cover in a sealing position and whereby said columns are in tension when said cooker is pressurized, a generally horizontal ring shrink-fitted around said cooker and extending outwardly therefrom, guiding passageways in said ring adapted to receive said columns and thereby support and accurately position said cooker between said columns.

8. A cylindrical pressure vessel and frame assembly comprising, a lower horizontal member having means for supporting said vessel in an upright position, a vertical column on each of two opposite sides of said vessel and rigidly secured at their lower ends to said lower member and extending upwardly and terminating in upper ends, a yoke swingably mounted at one end on one of said upper ends for horizontal swinging above said vessel, latch means for securing the said other upper end and the other end of said yoke together to prevent relative vertical movement therebetween, a top cover for sealing said vessel, a manually operated cam carried by said yoke for vertical positioning and holding said cover in a sealing position whereby said columns are in tension when said vessel is pressurized, a generally horizontal ring shrink-fitted around said vessel and extending outwardly therefrom, and guiding passageways in said ring adapted to receive said columns and thereby support and accurately position said vessel between said columns.

9. In combination with a pressure cooker having an open top, a support frame, a yoke pivotally attached to said frame for horizontal swinging above said open top between operative and non-operative positions, latch means for securing said yoke and frame together in the operative position; a cover for said open top, said cover having a vertical annular flange, an O-ring seal in the periphery of said flange and adapted to be sealingly engaged in said open top, said cover mounted on said yoke for vertical shifting between cooker closed and open positions, manually operated cam means mounted on said yoke for shifting said cover in either vertical direction, cooker pressure operated means mounted in said cover for engagement with said cam means whereby opening of said cover is precluded while pressure above a predetermined amount is present in said cooker.

References Cited in the file of this patent

UNITED STATES PATENTS

| | | |
|---|---|---|
| 1,473,408 | Richardson et al. | Nov. 6, 1923 |
| 2,073,950 | Seibert | Mar. 16, 1937 |
| 2,078,003 | Klein | Apr. 20, 1937 |
| 2,260,570 | John | Oct. 28, 1941 |
| 2,318,151 | Gary | May 4, 1943 |
| 2,483,256 | Berg | Sept. 27, 1949 |
| 2,513,630 | Elliott | July 4, 1950 |
| 2,534,164 | Finch | Dec. 12, 1950 |
| 2,596,353 | Zollinger | May 13, 1953 |
| 2,679,948 | Deardorff | June 1, 1954 |
| 2,722,339 | Saxon | Nov. 1, 1955 |

FOREIGN PATENTS

| | | |
|---|---|---|
| 56,459 | Germany | Feb. 5, 1890 |
| 275,130 | Switzerland | Apr. 5, 1949 |